R. A. PULLAR.
ATTACHMENT FOR MOTOR VEHICLES.
APPLICATION FILED NOV. 19, 1917.
1,273,270.
Patented July 23, 1918.
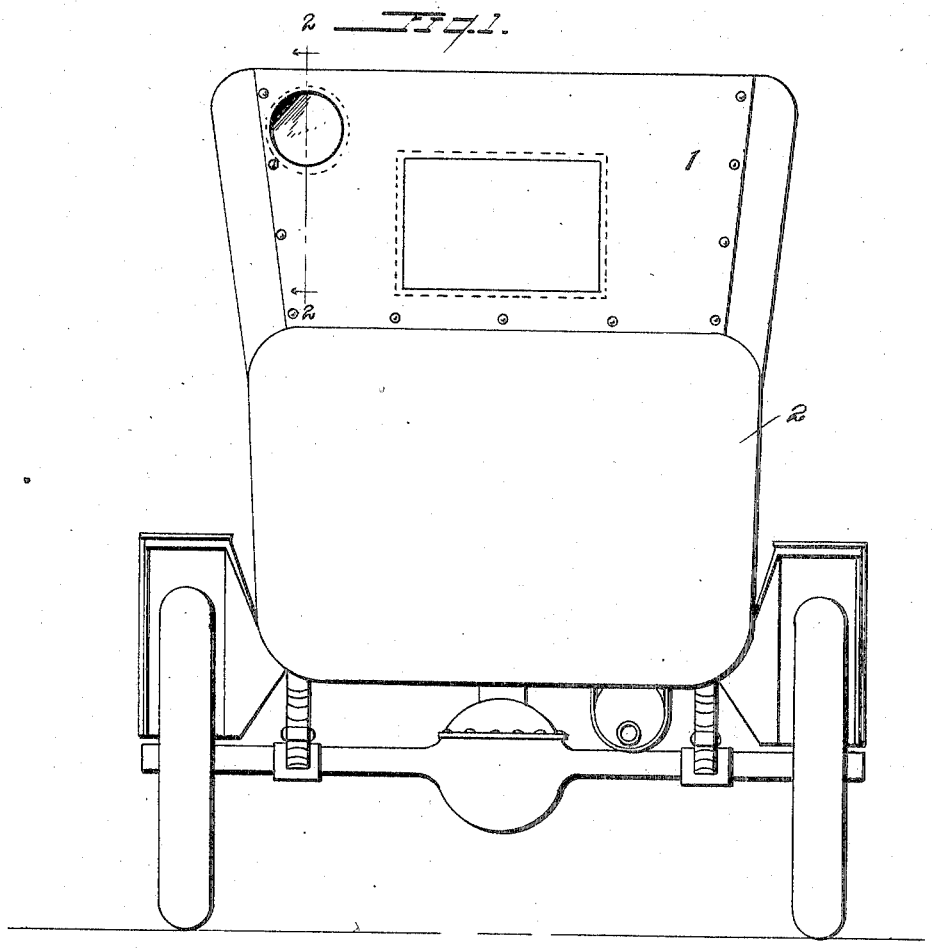
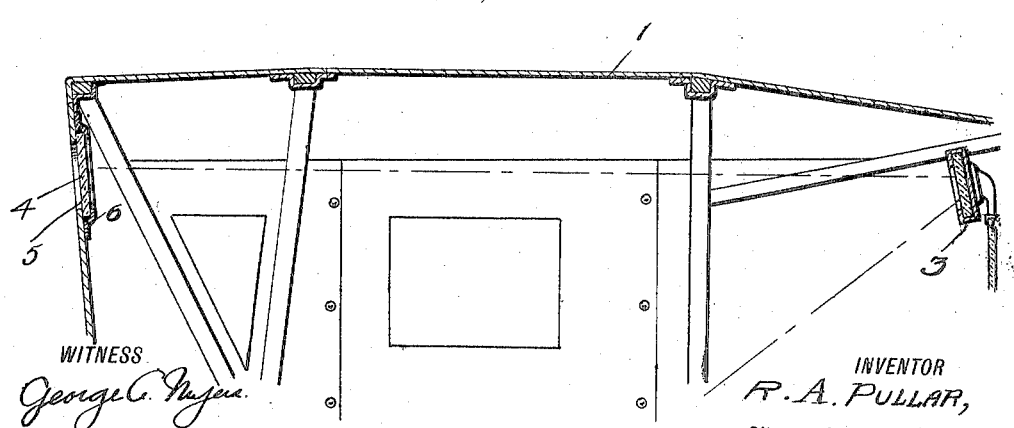
WITNESS
George G. Myers.
INVENTOR
R. A. PULLAR,
BY
ATTORNEYS

UNITED STATES PATENT OFFICE.

ROBERT ANDREW PULLAR, OF ANACORTES, WASHINGTON.

ATTACHMENT FOR MOTOR-VEHICLES.

1,273,270.  Specification of Letters Patent.  Patented July 23, 1918.

Application filed November 19, 1917. Serial No. 202,837.

*To all whom it may concern:*

Be it known that I, ROBERT ANDREW PULLAR, a citizen of the United States, and a resident of Anacortes, in the county of Skagit and State of Washington, have invented certain new and useful Improvements in Attachments for Motor-Vehicles, of which the following is a specification.

My invention is an improvement in attachments for motor vehicles, and has for its object to provide mechanism in connection with that type of a vehicle for permitting the driver to see following vehicles, by means of the usual mirror arranged at the front of the vehicle.

In the drawings:

Figure 1 is a rear view of a motor vehicle provided with the improvement;

Fig. 2 is a section on the line 2—2 of Fig. 1, looking in the direction of the arrows adjacent to the line.

The present embodiment of the invention is shown in connection with the top 1 of a motor vehicle 2. In the present instance the mirror 3, which is usually arranged extending outwardly from the wind shield or dash, is supported by the wind shield within the top, in convenient position for the driver to see the same.

At the rear, left upper corner of the top is arranged an opening 4 in the material of the top or in the rear curtain, and a disk 5 of transparent material as, for instance, glass, is arranged over the opening. This disk is held in place by a frame 6 which is secured to the top or curtain around the opening, and the disk is arranged in line with the mirror, as shown in Fig. 2, in such manner that the driver, looking into the mirror, which is in front of him, may see the following vehicles through the opening 4 at the rear.

It will be understood that the mirror 3 is high in order that the rays of light passing through the glass will not be interfered with in their passage to the mirror by the head of the driver. In other words, both the opening 4 and the mirror 3 are arranged above the level of the driver's head.

I claim:

1. In combination with a motor vehicle, of a mirror mounted on the wind shield within the top, said top having at the rear left upper corner an opening, and a disk of transparent material held over the opening in line with the mirror, said mirror and disk being above the level of the head of the driver when seated in the vehicle.

2. In combination with a motor vehicle, of a mirror mounted on the wind shield within the top, said top having at the rear left upper corner an opening, and a disk of transparent material held over the opening in line with the mirror.

ROBERT ANDREW PULLAR.

Copies of this patent may be obtained for five cents each, by addressing the "Commissioner of Patents, Washington, D. C."